US006495185B1

(12) United States Patent
Kurppa

(10) Patent No.: US 6,495,185 B1
(45) Date of Patent: Dec. 17, 2002

(54) FLAVORING COMPOSITION, PRODUCTION AND USE THEREOF

(75) Inventor: Lasse Juhani Kurppa, Helsinki (FI)

(73) Assignee: SLK Foundation (PA)

( * ) Notice: Subject to any disclaimer, the term of this patent is extended or adjusted under 35 U.S.C. 154(b) by 0 days.

(21) Appl. No.: 09/297,259

(22) PCT Filed: Jan. 20, 1997

(86) PCT No.: PCT/FI97/00027

§ 371 (c)(1),
(2), (4) Date: Jun. 16, 1999

(87) PCT Pub. No.: WO98/18348

PCT Pub. Date: May 7, 1998

(30) Foreign Application Priority Data

Oct. 31, 1996 (PA) ................................................ 083779

(51) Int. Cl.[7] ................................................ A23L 1/22
(52) U.S. Cl. ........................ 426/534; 426/535; 426/615; 426/638; 426/640; 426/649; 426/804
(58) Field of Search ................................ 426/534, 648, 426/804, 270, 535, 541, 597, 615, 640, 638, 649, 650

(56) References Cited

FOREIGN PATENT DOCUMENTS

WO            9633728           10/1996

OTHER PUBLICATIONS

Anon, Flavonoids: Dietary Sources of These Antioxidants, Nutrition Report, 12(1), Jan. 1994, p. 5., abstract only.*

Rombauer et al., Joy of Cooking, 1975, The Bobbs–Merrill Company, Inc., Indianapolis/New York, pp. 567–588.*

Paul Knekt et al., "Flavonoid intake and coronary mortality in Finland: a cohort study", *BJM*. vol. 312, pp. 478–481, (1996).

Michael G.L. Hertog et al., "Dietary antioxidant flavonoids and risk of coronary heart disease: the Zutphen Eldery Study", *The Lancet*. vol. 342, pp. 1007–1011, (1993).

J. Tang, CN 1093546 A, "Biological flavonoid health–care food additive".

Y. Bu et al., KR 9404838 B, "Extracting green tea flavonoid—by extracting with alcohol, and fractioning using sephadex column.".

* cited by examiner

*Primary Examiner*—Leslie Wong
(74) *Attorney, Agent, or Firm*—Browdy and Neimark, P.L.L.C.

(57) ABSTRACT

The invention relates to the use of flavonoids as flavoring substances and/or as salt substitutes. A mixture of several flavonoids such as from onion, apple and tea are mixed to form a composition. The flavonoid preparation may be used as a general flavouring substance and as a salt substitute in home cooking as well as in food industry.

2 Claims, No Drawings

FLAVORING COMPOSITION, PRODUCTION AND USE THEREOF

CROSS REFERENCE TO RELATED APPLICATION

The present application is the national stage under 35 U.S.C. 371 of PCT/FI97/00027, filed Jan. 20, 1997.

The present invention relates to the use of flavonoids as flavouring substances and/or as salt substitutes, to a composition containing flavonoids as well as to a process for the production of said flavonoid composition. A flavonoid powder preparation according to the present invention is especially well suited to be used as a general flavouring substance. The flavonoid composition according to the invention is suitable for replacing table salt totally or in part in household cooking as well as in food industry.

Flavonoids are one of the widest found groups of vegetable chemical compounds. They are polyphenolic antioxidants naturally present in vegetables, fruits, and beverages such as tea and wine. More than 2000 flavonoids have been found and identified. All flavonoids have a common biosynthetic origin and they therefore possess the same basic structural element, namely a 2-phenyl chromane skeleton. Flavonoids occur mainly as glycosides but they may also be in the form of free phenols and sulphates.

Oxidation of low density lipoproteins by free radicals is thought to play a central part in the development of atherosclerosis. Antioxidants may thus delay the onset of atherogenesis. Several flavonoid compounds have been shown to have antioxidant properties in vitro, inhibiting the oxidation of low density lipoproteins and reducing thrombotic tendencies by inhibiting platelet aggregation.

In a big Dutch study Hertog MGL, et al., Lancet 1993; 342:1007–11, showed that regular intake of foodstuffs which naturally contain flavonoids decreased mortality from myocardial infarction by half. The flavonoid content of the diet was calculated on the basis of an intake of tea, onions and apples.

A recent Finnish study by Knekt P., et al., BMJ, Feb. 24, 1996, Vol. 312, p. 478–481, supports the above findings. People eating a lot of apples and onions seem to be better protected from the risk of coronary diseases than those lacking said foodstuffs in their diet. Especially women seem to benefit from a diet rich of flavonoids. The risk of mortality from coronary diseases for the group of women receiving the biggest amount of flavonoids was only half of the risk for the group receiving the smallest amount. For men the difference was 20 per cent. According to the above study, flavonoids posses similar oxidation inhibiting effect on cells as vitamins E and C.

In the prior art the intake of flavonoids was provided by people eating flavonoid-containing fruits and vegetables or drinking flavonoid-rich beverages such as tea and wine.

The present invention is based on the realization that flavonoids may be extracted and/or powdered and made into a flavouring substance, a spice, which may be used as a general seasoning on or in food.

An object of the invention is thus to provide a functional spice based on flavonoids.

An object of the invention is also to provide a seasoning having an inherent taste of salt.

An object of the invention is further to provide a substitute for table salt in the food industry, in restaurants as well as in household cooking.

An object of the invention is also to provide a salt substitute for ready-made foods, bakery products, snacks, etc.

A further object of the invention is to provide an easy way of adding health bringing flavonoids to the normal diet of a person.

Another object of the invention is to provide a seasoning having antioxidant properties in vitro and in vivo and being capable of inhibiting the oxidation of low density lipoproteins and of reducing thrombotic tendencies by inhibiting platelet aggregation.

The use of the flavonoid flavouring substance according to the present invention will have the dual benefit of providing a good aromatic taste to the food and of supplementing the person's normal diet with healthy flavonoids without requiring him or her to drink a lot of wine or eat a lot of onions or apples.

By allowing a reduction of the salt intake in food by 50% or more, preferably down to 25% of the normal intake of salt, the present flavonoid composition provides for the first time a realistic way of reducing the amount of salt in the diet to an acceptable level while retaining the taste of salt in the food at an accustomed level. It is an accepted fact that reducing the salt intake to about 25% of the present normal level significantly reduces the risk for fatal coronary diseases.

In addition to a reduction of the salt intake, a regular and continuous intake of flavonoids as such also has the effect of reducing the risk for coronary diseases. Thus a dual benefit is obtained by the present invention in both a reduction of salt intake and an increase in flavonoid intake. The flavonoid composition of the present invention is easy to use and is suitable for both household and industrial use.

The present invention is defined in the appended claims.

Thus, the present invention is directed to the use of flavonoids as flavouring substances. According to the invention the flavonoid flavouring may be used in food industry, in restaurants as well as in household cooking. The preferred use comprises use as a substitute for salt in food.

The flavonoid flavouring of the present invention may be used in the food industry in ready-made foods, in bakery products, in snacks, beverages, etc. Since the flavonoids are only marginally affected by normal cooking temperatures, the flavonoids may be included into the food before cooking. If the flavonoids are to be sprinkled on the surface of foods. it may be desirable to add the flavonoids after the cooking since the flavonoid flavouring composition may be coloured dark by the heating process.

In an especially preferred use of the present invention the flavonoids are sprinkled on potato chips after the deep frying procedure as a substitute for all or part of the salt normally used. In another preferred embodiment, at least a part of the salt used in baking bread is replaced by flavonoid flavouring.

The preferred flavonoids are selected from flavonoids of onion, tea and apple, and an especially preferred mixture comprises a powdered spice containing onion powder (about 30%), green or black tea extract (about 34%), and apple powder (about 18%) with the rest being made up of an edible carrier such as di- or tricalcium phosphate and/or silicon dioxide.

The present invention is also directed to a flavouring composition containing the above flavonoids or flavonoid mixture. The flavonoid composition of the present invention contains a combination of several, preferably at least three flavonoids, which are preferably selected so as to provide a salty taste. Thus, a preferred embodiment comprises a flavouring substance which may substitute table salt.

The present invention also relates to a process for the preparation of a flavouring composition, wherein onion powder. tea extract and apple powder are mixed with an edible carrier to provide a flavonoid spice composition.

The flavonoid powder preparation developed according to the invention is classified as a Functional Food or a Functional Spice and it can be used as a general flavouring substance.

It is especially well suited for flavouring foods, but it may also be used to flavor beverages, snacks, etc.

The preferred embodiment according to the invention comprises a mixture of flavonoids contained in onion powder, green tea extract and apple powder. Although this seasoning does not contain any table salt at all, it has a taste which resembles that of a mild aroma salt. A specific benefit of the invention is obtained when the seasoning according to the invention is used to replace salt in the cooking of food. This makes it possible to reduce the amount of salt in the food without a reduction of the salty taste, thus providing a significant health benefit.

A daily use of the flavonoid seasoning in normal cooking at home, in restaurants. and/or in ready-made foods will ensure that the population will get a sufficient intake of flavonoids with their normal diet. This is believed to reduce the likelihood of coronary heart diseases and to decrease the mortality from myocardial infarction. In the preparation of food at home, the flavonoid seasoning may be portioned according to each person's taste. Since flavonoids do not decompose at heating, cooking of the food does not cause a problem.

The seasoning according to the invention may be used for example:
- as such as a flavouring lacking salt;
- as a flavouring including about 25% salt;
- in olive oil to give taste for salad dressings;
- on slices of tomato and cucumber for example on top of slices of bread;
- in the flavouring of all kinds of meat dishes;
- in making aroma butter or aroma margarine to be used on top of a steak;
- in making a herbal salt by adding ordinary table salt to the flavonoid seasoning;
- in making a grill salt by combining about 25% table salt with about 75% (by weight) of the flavonoid seasoning;
- as a liquid or solid salt substitute in the food industry; etc.

The persons skilled in the art will realize that there exist a huge number of ways in which the flavonoid seasoning can be included into the diet, and the present invention should not be considered limited to the examples listed in the present specification.

The beneficial effect of the seasoning according to the invention on health is based on the flavonoids, especially a combination of flavonoids from apple, onion and tea, which the product contains. In the preferred flavouring composition the natural protective agents are in the right proportion to each other and the product so maximizes the flavonoid-protection.

It will be obvious to persons skilled in the art that the proportions of the flavonoids may be varied according to the taste and need of the users. For instance, in a district where green tea is drunk in large amounts, the preferred seasoning may comprise less of the green tea extract and more of one or the other flavonoid ingredients. However, it has been found to be especially beneficial to mix onion powder and green tea extract in fairly equal amounts with about half that amount of apple powder.

The seasoning according to the invention may also contain other components, such as other vegetable components containing flavonoids and components having other properties, such as special flavouring properties not natural to the flavonoids in question.

The seasoning according to the invention is preferably mixed with edible carrier or filler compounds which are easily powdered and which add body to the seasoning. Such carriers are preferably inert compounds such as calcium phosphate and/or silica. The seasoning may also be produced in liquid or paste form and added to other seasonings such as mustard or soya sauce.

In many industrial applications the flavonoid composition may be used as such to be included as a flavouring and/or salt substitute into ready-made foods, bread, snacks, etc. The flavonoid composition has been found to have an antioxidant property which also is useful in the food industry.

The invention will now be illustrated with the aid of some non-limiting examples.

EXAMPLE 1

Production of a Flavonoid Seasoning

About 18 kg of onion powder, about 20 kg of tea extract and about 11 kg of apple powder were mixed with dicalcium phosphate dihydrate and silicon dioxide and sieved to remove oversized particles. The components were then thoroughly mixed to provide 60.6 kg of a homoaeneous powder.

The composition of the seasoning powder was the following:

| | |
|---|---|
| onion powder | 30% |
| tea extract | 34% |
| apple powder | 18% | dicalcium phosphate dihydrate and silicon dioxide q.s.

The powdered mixture was portioned into boxes and used as seasoning in household cooking. The taste was salty and aromatic with a flavour of onions.

EXAMPLE 2

Flavonoid Seasoning with Salt

A flavonoid seasoning was produced substantially as in Example 1 with the addition that about 25% by weight salt (NaCl) was added to the composition to provide the following salty seasoning:

| Flavonoid seasoning with salt | |
|---|---|
| onion powder (sterile) | 22.56% |
| apple powder | 13.53% |
| green tea | 25.56% |
| silicon dioxide (E551) | 13.31% |
| tricalcium phosphate (E341) | 0.23% |
| salt (NaCl) | 24.81% |
| | 100.00% |

EXAMPLE 3

Flavonoid Containing Grilling Seasoning

A flavonoid grilling seasoning was produced by mixing the following ingredients into a homogeneous mixture:

| | Flavonoid grilling seasoning | | |
|---|---|---|---|
| Code | | | ES 140197 Amount, % |
| | NaCl | | 25.00% |
| 041900 | green tea | 14.49 | 10.87% |
| 022000 | onion powder (sterile) | 12.79 | 9.59% |
| 006000 | sodium glutamate (E621) | 10.22 | 7.67% |
| 007100 | dextrose monohydrate | 9.50 | 7.13% |
| 041800 | apple powder | 7.67 | 5.75% |
| 039800 | silicon dioxide (E551) | 7.55 | 5.66% |

-continued

Flavonoid grilling seasoning

| Code | | | ES 140197 Amount, % |
|---|---|---|---|
| 008300 | chicken aroma | 6.00 | 4.50% |
| 012500 | paprika powder | 5.90 | 4.43% |
| 021300 | provabis | 5.67 | 4.25% |
| 022500 | onion powder | 5.05 | 3.79% |
| 012300 | white pepper ground | 4.30 | 3.23% |
| 009700 | coriander ground | 3.85 | 2.89% |
| 012400 | nutmeg ground | 2.26 | 1.70% |
| 900800 | capiscum extract | 1.22 | 0.92% |
| 023100 | garlic powder | 1.15 | 0.86% |
| 015400 | paprika color ole | 0.90 | 0.68% |
| 015700 | celery ole | 0.37 | 0.28% |
| 006900 | tricalcium phosphate c. 13-01 (E341) | 0.46 | 0.35% |
| 010100 | lovage root | 0.19 | 0.14% |
| 014800 | curcumae ole | 0.46 | 0.35% |
| | | 100.00 | 100.00% |

EXAMPLE 4
Analysis of a Flavonoid Seasoning

A seasoning produced substantially according to Example 1 from onion powder, green tea extract and apple powder was analyzed for its flavonoid content by chromatography.

Two samples of the seasoning were provided. Sample I (5.02 g) was weighed and hydrolysed with 2 N hydrochloric acid at 100° C. for 45 min. and then evaporated to dryness. The residue was dissolved in 25 ml of methanol. Sample II (2.09 g) was extracted with 70% methanol by an ultrasonic method.

The HPLC was performed using quercetin (a natural flavonoid having the formula $C_{15}H_{10}O_7$ $2H_2O$) as a reference. Analysis by step gradient elution was performed using as the mobile phase eluent A%:water:$H_3PO_4$ (1000:0.53 v/v) and eluent B%:methanol, as follows:

| Step | Time (min) | A % | B % | Curve |
|---|---|---|---|---|
| 0 | 5.0 | 95 | 5 | 0 |
| 1 | 15.0 | 40 | 60 | 1 |
| 2 | 15.0 | 40 | 60 | 0 |
| 3 | 10.0 | 5 | 95 | 0 |

The flow rate was 1 ml/min and the injection volume was 10 μl. The UV spectra were detected at 210–365 nm and the chromatograms at 260 nm. The DAD detection was at 200–365 nm with the detection wavelength being at 260 and 370 nm.

Peaks from the samples were identified by comparing retention times and UV spectra. Major peaks were preliminarily identified as flavonoids by UV spectra and with DAD detection.

The total content of detected compounds in samples I and II were calculated as quercetin 7.97 and 1.66 mg, respectively, in 1 g of the flavonoid seasoning.

EXAMPLE 5
Use of the Flavonoid Seasoning in Baking Bread

A seasoning substantially as in Example 1 which contained food additives E 341 and E 551 was used to replace salt in the baking of bread.

Two types of white wheat bread were baked in a baking laboratory of the University of Helsinki, Department of Food Technology. The reference bread type was a standard white bread and its ingredients were:

Wheat flour (commercially available in Finland) 900 g
Water (25° C.) 594 g
Dry yeast 14.4 g
Sugar 13.5 g
Ascorbic acid 90 mg
Salt (NaCl) 13.5 g The ingredients of the flavonoid containing bread were identical except that the salt was replaced by 13.5 g of the flavonoid seasoning.

The doughs were made in a Farinograph bowl for 7 minutes and the formation of the dough was monitored by the Farinograph. The doughs were divided into three bread forms (7 cm×8 cm×19 cm). The breads were raised for 60 minutes in an oven with a temperature of 32° C. and humidity of 85%. After raising, the breads were baked at 225° C. for 25 minutes and 5 minutes at 200° C.

Both types of breads were made as three separate batches. One batch was stored in –20° C. and two batches were used for the analyses.

Two separate bread samples of both bread types were analyzed. Approximately 12 g of bread were weighed and extracted by 30 ml methanol:water (80:20) by an Ultraturrax homogenizer for 1 minute. The samples were centrifuged for 10 minutes at 1500 rpm and the clear solvent were separated. The extraction was repeated three times and the solvents were combined and evaporated under rotary evaporator to dryness. The sample residue was dissolved into 2 ml methanol and subjected to HPLC analysis. The flavonoid content was measured by HPLC as quercetin.

The breads were found to contain the same peaks as the flavonoid seasoning, indicating that the flavonoids were not harmed by the baking temperature.

EXAMPLE 6
Baking Properties of the Flavonoid Seasoning

Three breads were made having the same general ingredients as those in Example 5, substituting in one bread half of the salt and in another bread all of the salt with the flavonoid seasoning of Example 1. One reference bread was made with the normal salt content. The baking conditions were the same as in Example 5.

The breads containing the flavonoid seasoning were darker in color and the pores were slightly smaller than in the reference bread. The taste of the flavonoid breads was less salty, but the taste was pleasant.

Although the gluten formation in the dough decreased with increasing substitution of salt by flavonoids, the volumes of the different types of breads did not differ very much. There was, however, an increasing trend in density when the salt content decreased and flavonoid content increased in the breads (FIG. 2).

The weights and volumes of the three breads are shown below

| Bread | Weight (g) | Volume (l) |
|---|---|---|
| 1.5% salt | 454.0 | 1.630 |
| 0.75% salt | 454.4 | 1.555 |
| 0% salt | 444.1 | 1.48 |

The bread containing no salt had a higher density than the two other breads. This indicates that flavonoids may well be used to replace 50% or more of the salt in bread.

EXAMPLE 7

Use of Flavonoids in Potato Chips

Potato chips were manufactured in a small scale deep fat fryer for household use (Krups). The potatoes (Rosamunda, Finland) were peeled and sliced for a thickness of approximately 1 mm. The slices were washed twice by hand warm tap water and pre-dried between two adsorbent papers. The slices were dried further in an oven at 100° C. for 3,5 minutes. The slices were then deep fat fried in frying oil composing of ¼ virgin olive oil and ¾ refined olive oil. The oil temperature was 161° C. The potato chips were fried as 50–70 g batches each 2.5–3 minutes until slightly brown.

Half of the chips were salted (1.5% salt) and unseasoned and half of them were seasoned with only 3% the flavonoid seasoning of Example 1 and no salt.

The flavonoid seasoning gave a seasoned and slightly salty taste to the potato chips. Especially onion flavor was detectable in the chips seasoned with flavonoids. Compared to the reference chips (1.5% salt), the flavonoid chips were slightly darker in color and especially the green tea seemed to give color to the product.

Both sample types were extracted with methanol:water (80:20). The fat extracted in the samples was removed by freezing the samples overnight and removing the solid fat from the extracts.

Flavonoid compounds were detected by HPLC in the chips containing flavonoid seasoning in the same retention area as the flavonoid powder.

EXAMPLE 8

Effect of Flavonoids on Oxidation

In order to estimate the effect of flavonoids on oxidation, the chips of Example 7 were subjected to an oxidation test. The potato chips containing 3% flavonoid seasoning and unseasoned (salted) potato chips were oxidized in screwed cap jars in the dark at 40° C. Samples for peroxide value measurements were taken once a week during a 4 weeks period.

Oxidation of the potato chips were monitored by spectrophotometric peroxide value measurement. The fat was extracted three times by 4 ml hexane:isopropanol (1:1) in a rotating extractor. The extracts were combined, solvent evaporated in a rotary evaporator and the sample residue dissolved into 5 ml heptane. The peroxide value measurement of samples was performed by a ferric thiocyanate method.

After 2 and 3 weeks of oxidation the potato chips containing flavonoids had oxidized slightly less than the reference samples. However, after 4 weeks of oxidation no difference were detected between the samples.

In the above Examples the use of flavonoids in various foods has been disclosed. It should be understood that the above Examples are only illustrative indications of the usefulness of the flavonoids in foods. A person skilled in the art will find various other ways of using flavonoids as seasoning and salt substitute in foods. The greatest benefits of the invention lie especially in the easy way in which it is possible to increase the flavonoid intake and at the same time reduce the salt intake.

I claim:

1. Flavoring composition characterized in that said composition comprises a powdered mixture of

| | |
|---|---|
| onion powder | 30% |
| tea extract | 34% |
| apple powder | 18% | dicalcium phosphate dihydrate and silicon dioxide.

2. Process for the preparation of a flavoring composition, characterized in that onion powder, green or black tea extract and apple powder are sieved with calcium phosphate and silicon dioxide and mixed with an edible carrier until the mixture forms a homogenous powdered flavoring composition, further characterized in that the proportions of said composition are

| | |
|---|---|
| onion powder | 30% |
| tea extract | 34% |
| apple powder | 18% | dicalcium phophate dihydrate and silicon dioxide.

* * * * *